US009328210B2

(12) United States Patent
Terheiden et al.

(10) Patent No.: US 9,328,210 B2
(45) Date of Patent: May 3, 2016

(54) ADDITIVE COMPOSITION USEFUL FOR CONTROLLING THE FOAM PROPERTIES IN THE PRODUCTION OF FLEXIBLE POLYURETHANE FOAMS CONTAINING POLYOLS BASED ON RENEWABLE RAW MATERIALS

(75) Inventors: Annegret Terheiden, Alpen (DE); Roland Hubel, Essen (DE); Michael Ferenz, Essen (DE)

(73) Assignee: EVONIK DEGUSSA GMBH, Essen (DE)

( * ) Notice: Subject to any disclaimer, the term of this patent is extended or adjusted under 35 U.S.C. 154(b) by 42 days.

(21) Appl. No.: 13/558,934

(22) Filed: Jul. 26, 2012

(65) Prior Publication Data

US 2013/0190414 A1    Jul. 25, 2013

(30) Foreign Application Priority Data

Jul. 26, 2011 (DE) .......................... 10 2011 079 791

(51) Int. Cl.

| | |
|---|---|
| *C08J 9/42* | (2006.01) |
| *C08G 18/18* | (2006.01) |
| *C08G 18/48* | (2006.01) |
| *C08G 18/76* | (2006.01) |
| *C08K 5/20* | (2006.01) |
| *C08K 5/3445* | (2006.01) |
| *C08K 5/549* | (2006.01) |
| *C08J 9/28* | (2006.01) |
| *C08J 9/33* | (2006.01) |
| *C08J 9/38* | (2006.01) |
| *C08J 9/00* | (2006.01) |
| *C08G 101/00* | (2006.01) |

(52) U.S. Cl.
CPC ............... *C08J 9/0042* (2013.01); *C08G 18/18* (2013.01); *C08G 18/4829* (2013.01); *C08G 18/7621* (2013.01); *C08J 9/0028* (2013.01); *C08J 9/0033* (2013.01); *C08J 9/0038* (2013.01); *C08K 5/20* (2013.01); *C08K 5/3445* (2013.01); *C08K 5/549* (2013.01); *C08G 2101/0008* (2013.01); *C08G 2101/0083* (2013.01); *C08J 2375/04* (2013.01)

(58) Field of Classification Search
CPC ................ C08J 9/33; C08J 9/42; C08J 18/18
USPC .................... 521/110, 120, 123, 129
See application file for complete search history.

(56) References Cited

U.S. PATENT DOCUMENTS

| | | | |
|---|---|---|---|
| 3,346,557 A | 10/1967 | Patton, Jr. et al. | |
| 3,620,984 A * | 11/1971 | Manfred Dahm et al. | .... 521/111 |
| 4,588,755 A | 5/1986 | Kollmeier et al. | |
| 4,687,786 A | 8/1987 | Kollmeier et al. | |
| 4,751,251 A * | 6/1988 | Thornsberry | ............. 521/112 |
| 5,034,427 A * | 7/1991 | Frigo et al. | ............. 521/163 |
| 5,093,376 A | 3/1992 | Mohring et al. | |
| 5,565,194 A | 10/1996 | Burkhart et al. | |
| 5,633,292 A | 5/1997 | Brune et al. | |
| 5,990,187 A | 11/1999 | Boinowitz et al. | |
| 6,291,622 B1 | 9/2001 | Drose et al. | |
| 6,380,273 B1 | 4/2002 | Eilbracht et al. | |
| 6,433,121 B1 | 8/2002 | Petrovic et al. | |
| 6,737,446 B1 * | 5/2004 | Burdeniuc | ............. 521/128 |
| 7,834,122 B2 | 11/2010 | Ferenz et al. | |
| 7,838,566 B2 | 11/2010 | Glos et al. | |
| 7,964,694 B2 | 6/2011 | Ferenz et al. | |
| 8,030,366 B2 | 10/2011 | Ferenz et al. | |
| 8,172,936 B2 | 5/2012 | Herrwerth et al. | |
| 2002/0103091 A1 | 8/2002 | Kodali | |
| 2003/0220445 A1 | 11/2003 | Mayer et al. | |
| 2006/0178443 A1* | 8/2006 | Boinowitz et al. | ............. 521/99 |
| 2006/0229375 A1 | 10/2006 | Hsiao et al. | |
| 2006/0293400 A1 | 12/2006 | Wiltz, Jr. et al. | |
| 2008/0114105 A1 | 5/2008 | Hell et al. | |
| 2008/0146688 A1* | 6/2008 | Glos et al. | ............. 521/110 |
| 2009/0088489 A1 | 4/2009 | Terheiden et al. | |

(Continued)

FOREIGN PATENT DOCUMENTS

| | | |
|---|---|---|
| CN | 1668664 A | 9/2005 |
| DE | 3508292 | 6/1986 |

(Continued)

OTHER PUBLICATIONS

Hou, C.T., "Microbial Oxidation of Unsaturated Fatty Acids", Adv. Appl. Microbiol., Feb. 1995; vol. 41, pp. 1-23.
Petrovic, Z.S., et al. "Structure and Properties of Polyurethanes Prepared From Triglyceride Polyols by Ozonolysis", Biomacromolecules Mar.-Apr. 2005, 6, pp. 713-719.
Translation of the Examiner's comments in a Chinese Office Action received in a corresponding foreign application (Transaction History as found on the Chinese Patent Website).

*Primary Examiner* — Melissa Rioja
(74) *Attorney, Agent, or Firm* — Scully, Scott, Murphy & Presser, P.C.

(57) ABSTRACT

The present invention relates to an additive composition useful as additive for controlling the foam properties of polyurethane foams which is characterized in that it contains at least one ionic surfactant A selected from those of formula $A^-M^+$ where $A^-$ = anion selected from the group comprising alkyl and aryl sulphates, polyether sulphates and sulphonates, sulphonates, alkyl and aryl sulphonates, alkyl and aryl carboxylates, saccharinates and polyether phosphates, and $M^+$ = cation, and/or at least one anionic surfactant B selected from a quaternized ammonium compound, and at least one tertiary amine compound C, which has a molar mass of at least 150 g/mol, and/or at least one oxazasilinane D, a process for production of polyurethane foam by using this additive composition and also correspondingly produced polyurethane foams and use thereof.

11 Claims, No Drawings

(56) References Cited

U.S. PATENT DOCUMENTS

| | | | |
|---|---|---|---|
| 2010/0034765 A1 | 2/2010 | Herrwerth et al. | |
| 2010/0036011 A1 | 2/2010 | De Gans et al. | |
| 2010/0081763 A1 | 4/2010 | Meyer et al. | |
| 2010/0113633 A1 | 5/2010 | Henning et al. | |
| 2010/0240786 A1* | 9/2010 | Glos et al. | 521/170 |
| 2010/0286295 A1 | 11/2010 | Heisler et al. | |
| 2010/0298455 A1 | 11/2010 | Henning et al. | |
| 2011/0015290 A1 | 1/2011 | Schmitz et al. | |
| 2011/0034576 A1 | 2/2011 | Henning et al. | |
| 2011/0042004 A1 | 2/2011 | Schubert et al. | |
| 2011/0046305 A1 | 2/2011 | Schubert et al. | |
| 2011/0230619 A1 | 9/2011 | Kuppert et al. | |
| 2011/0230633 A1 | 9/2011 | Ferenz et al. | |
| 2012/0010302 A1 | 1/2012 | Hartung et al. | |
| 2012/0027704 A1 | 2/2012 | Henning et al. | |
| 2012/0029090 A1 | 2/2012 | Brugger et al. | |
| 2012/0097883 A1 | 4/2012 | Henning et al. | |

FOREIGN PATENT DOCUMENTS

| | | |
|---|---|---|
| DE | 4444898 | 10/1996 |
| DE | 19629161 | 1/1998 |
| DE | 19859759 | 6/2000 |
| DE | 102005050473 | 4/2007 |
| DE | 102007046860 | 4/2009 |
| DE | 102010039004 | 2/2012 |
| EP | 0152878 | 8/1985 |
| EP | 0380993 | 8/1990 |
| EP | 0409035 | 1/1991 |
| EP | 0493836 | 7/1992 |
| EP | 0532939 | 3/1993 |
| EP | 0867464 | 9/1998 |
| EP | 1061095 | 12/2000 |
| EP | 1095968 | 5/2001 |
| EP | 1350804 | 10/2003 |
| EP | 1678232 | 7/2006 |
| EP | 1683831 | 7/2006 |
| WO | WO2004020497 | 3/2004 |
| WO | WO2004096744 | 11/2004 |
| WO | WO2004096882 | 11/2004 |
| WO | WO2005033167 | 4/2005 |
| WO | WO2006094227 | 9/2006 |
| WO | WO2006116456 | 11/2006 |
| WO | WO2008023436 | 2/2008 |
| WO | WO2009058367 | 5/2009 |
| WO | WO2011015286 A1 | 2/2011 |

* cited by examiner

ADDITIVE COMPOSITION USEFUL FOR CONTROLLING THE FOAM PROPERTIES IN THE PRODUCTION OF FLEXIBLE POLYURETHANE FOAMS CONTAINING POLYOLS BASED ON RENEWABLE RAW MATERIALS

FIELD OF THE INVENTION

The present invention relates to an additive composition useful as an additive for controlling the foam properties of polyurethane foams, a process for production of polyurethane foam by using the additive composition and also the correspondingly produced polyurethane foams and use thereof.

BACKGROUND

Polyurethanes of differing types are produced by the polymerization of diisocyanates, for example 4,4'-methylenebis (phenyl isocyanate), MDI for short, or 2,4-tolylene diisocyanate, TDI for short, with polyether polyols or polyester polyols. Polyether polyols are obtainable, for example, by alkoxylation of polyhydroxy-functional starters. Examples of common starters are glycols, glycerol, trimethylolpropane, pentaerythritol, sorbitol or sucrose. Polyurethane foams are produced using additional blowing agents, for example, pentane, methylene chloride, acetone or carbon dioxide. It is customary to use surface-active substances, especially surfactants, to stabilize the polyurethane foam. In addition to a few organic based surfactants, silicone surfactants are typically used because of their higher interface stabilization potential.

A multiplicity of different polyurethane foams are known, examples include hot-cure flexible foam, cold-cure foam, ester foam, rigid PUR foam and rigid PIR foam. The stabilizers used have been specifically developed to match the particular end use, and typically give a distinctly altered performance if used in the production of other types of foam.

In the prior art, the polysiloxane-polyoxyalkylene copolymers used for polyurethane foam stabilization are generally produced by noble metal-catalyzed hydrosilylation of unsaturated polyoxyalkylenes with SiH-functional siloxanes, so-called hydrogen siloxanes, as described, for example, in EP 1 520 870. The hydrosilylation can be carried out batchwise or continuously, as described, for example, in DE 198 59 759 C1.

A multiplicity of further documents, such as, for example, EP 0 493 836 A1, U.S. Pat. No. 5,565,194 or EP 1 350 804, each disclose specifically assembled polysiloxane-polyoxyalkylene copolymers to achieve specific performance profiles for foam stabilizers in diverse polyurethane foam formulations.

In view of the fact that the availability of fossil resources, namely mineral oil, coal and gas, is limited in the long run and against the background of rising crude oil prices, there has been increased interest in recent years in using polyols based on renewable raw materials for producing polyurethane foams (see, WO 2005/033167 A2; U.S. Patent Application Publication No. 2006/0293400 A1). In the meantime, a whole series of these polyols has become available on the market from various producers (see, WO 2004/020497, U.S. Patent Application Publication No. 2006/0229375, or WO 2009/058367). Depending on the source of the raw material (e.g., soybean oil, palm oil or castor oil) and the subsequent processing steps, the polyols obtained differ in their property profiles. Essentially two groups can be distinguished:

a) polyols based on renewable raw materials which are modified such that they can be used at 100% for production of polyurethane foams (see WO 2004/020497, or U.S. Patent Application Publication No. 2006/0229375), b) polyols based on renewable raw materials which, due to their processing and properties, can replace the petrochemically based polyol to only a certain extent (see WO 2009/058367, or U.S. Pat. No. 6,433,121).

The use of vegetable polyols of group B has distinct repercussions for the production of flexible polyurethane block foams, both for the process management and the physicochemical properties of the resulting foam. For instance, the use of vegetable polyols produced from soybean oil or palm oil leads with increasing use level, under otherwise unchanged processing conditions, to a lengthening in rise time, a change in hardness and air permeability and also to reduced elongation at break, tensile strength and elasticity for the foam. Some changes, for example, rise time and air permeability, can be held in check by appropriately adapting the formulation, i.e., the catalyst combination. Other physical properties such as, for example, hardness, elongation at break, tensile strength and elasticity remain adversely changed.

U.S. Patent Application Publication No. 2010/0286295A1 and DE 102010039004 describe specific stabilizer structures for improving the physical properties of flexible polyurethane block foams from vegetable polyols. However, these stabilizers were specifically developed for the production of flexible polyurethane block foams from vegetable polyols. It is not advisable to use these stabilizers in conventional foam types, which do not contain any vegetable polyols. The result would be, for example, an excessive settling of the foam and a non-optimal density distribution within the foam block. However, customers prefer to use stabilizers that can be used for standard foams as well as flexible polyurethane slabstock foams from vegetable polyols.

SUMMARY OF THE INVENTION

The problem addressed by the present invention was therefore that of providing additives that make it possible to improve the physical properties of flexible polyurethane block foams based on vegetable polyols and at the same time permit using conventional stabilizers.

It was surprisingly found that this problem can be solved by an additive composition which contains at least one ionic surfactant A selected from those of formula $A^-M^+$ where $A^-$=anion selected from alkyl and aryl sulphates, polyether sulphates and sulphonates, sulphonates, alkyl and aryl sulphonates, alkyl and aryl carboxylates, saccharinates and polyether phosphates, and $M^+$=cation, and/or at least one ionic surfactant B preferably selected from a quaternized ammonium compound, and at least one tertiary amine compound C, which has a molar mass of at least 150 g/mol, and/or at least one oxazasilinane D. The additive composition of the present invention is useful as an additive for controlling the foam properties of polyurethane foams.

The present invention also provides a process for production of polyurethane foams which utilizes the additive composition of the present invention. The present invention further provides polyurethane foams obtained via the process of the present invention and also articles of manufacture obtained therefrom.

Using the additive composition of the present invention makes it possible, by using vegetable polyols, to produce flexible polyurethane foams which, compared with flexible polyurethane foams obtained without additive, have improved physical properties.

The additives of the present invention further have the advantage that, in the production of hot-cure flexible polyurethane foams using vegetable polyols, the inventive additives lead to more finely celled flexible polyurethane foams.

The additive compositions of the present invention also have the advantage that they can be used in combination with conventional stabilizers.

DETAILED DESCRIPTION OF THE INVENTION

The additive compositions of the present invention and the use thereof will now be described by way of example without any intention to restrict the invention to these exemplary embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. Where documents are cited in the context of the present description, their content shall fully belong to the disclosure content of the present invention. Percentages are by weight, unless otherwise stated. Averages reported hereinbelow are weight averages, unless otherwise stated. Unless otherwise stated, the molar mass of the compounds used was determined by gel permeation chromatography (GPC) and the determination of the structure of the compounds used by NMR methods, especially by $^{13}C$ and $^{29}Si$ NMR. When chemical (empirical) formulae are used in the present invention, the indicated indices can be not only absolute numbers but also average values. In the case of polymeric compounds, the indices are preferably average values. When measured values are indicated hereinbelow, these measurements were carried out at standard conditions (25° C. and 1013 mbar), unless otherwise stated.

The additive compositions of the present invention, preferably useful as additives for controlling the foam properties of polyurethane foams, are notable in that they contain a) at least one ionic surfactant A selected from those of formula (I)

$$A^-M^+ \quad (I)$$

where $A^-$=anion selected from alkyl and aryl sulphates, polyether sulphates and sulphonates, sulphonates, alkyl and aryl sulphonates, alkyl and aryl carboxylates, saccharinates and polyether phosphates, and $M^+$=cation, other than an ammonium cation, preferably metal cation, more preferably alkali metal cation and even more preferably potassium or sodium cation, and/or b) at least one ionic surfactant B selected from a quaternized ammonium compound, and
c) at least one tertiary amine compound C, which is not an oxazasilinane and has a molar mass of at least 150 g/mol and preferably at least 200 g/mol, and which is preferably in a concentration of 0.5% by mass in water reduces the static surface tension of this solution to below 40 N/m, and/or, preferably and,
d) at least one oxazasilinane D.

The surfactant B is preferably selected from an imidazolium compound, a pyridinium compound or a compound of formula (IIa) to (IIc)

$$NR^2_xR^3_{4-x}{}^+X^- \quad (IIa)$$

$$R^{1'}R^{2'}R^{3'}R^{4'}N^+X^- \quad (IIb)$$

$$R^{1'}R^{2'}N^+{=}CR^{3'}R^{4'}X^- \quad (IIc)$$

where x=0 to 4, preferably 1 to 3, more preferably 2 or 3, $X^-$=anion, $R^2$=alike or different, preferably alike, alkyl moieties having 1 to 3 carbon atoms, preferably two carbon atoms and more preferably one carbon atom,
$R^3$=alike or different hydrocarbon moieties having 5 to 30, preferably 8 to 20 carbon atoms, and optionally containing double bonds, aryl moieties, alkylaryl moieties or alkoxylated hydrocarbon moieties, polyether moieties of formula (VI)

$$-(CH_2)_y-O-(C_2H_4O)_o-(C_3H_6O)_p-OH \quad (VI)$$

where o and p are each independently from 0 to 100, preferably from 0 to 50 provided the sum total of o+p is always above 0 and y is from 2 to 4 and preferably 2.

$R^{1'}$, $R^{2'}$, $R^{3'}$, $R^{4'}$ are alike or different and represent hydrogen, a linear or branched optionally double bond-containing aliphatic hydrocarbon moiety having 1 to 30 carbon atoms, an optionally double bond-containing cycloaliphatic hydrocarbon moiety having 5 to 40 carbon atoms, an aromatic hydrocarbon moiety having 6 to 40 carbon atoms, an alkylaryl moiety having 7 to 40 carbon atoms, a linear or branched optionally double bond-containing aliphatic hydrocarbon moiety having 2 to 30 carbon atoms interrupted by one or more heteroatoms, especially oxygen, NH, NR' with R' an optionally double bond-containing $C_1$-$C_{30}$-alkyl moiety, especially —$CH_3$, a linear or branched optionally double bond-containing aliphatic hydrocarbon moiety having 2 to 30 carbon atoms interrupted by one or more functionalities selected from the group —O—C(O)—, —(O)C—O—, —NH—C(O)—, —(O)C—NH, —($CH_3$)N—C(O)—, —(O)C—N($CH_3$)—, —$S(O_2)$—O—, —O—$S(O_2)$—, —$S(O_2)$—NH—, —NH—$S(O_2)$—, —$S(O_2)$—N($CH_3$)—, —N($CH_3$)—$S(O_2)$—, a linear or branched optionally double bond-containing aliphatic or cycloaliphatic hydrocarbon moiety having 1 to 30 carbon atoms terminally functionalized OH, OR', $NH_2$, N(H)R', $N(R')_2$ (with R' an optionally double bond-containing $C_1$-$C_{30}$-alkyl moiety) or a blockwise or random polyether as per —$(R^{5'}-)_n$—$R^{6'}$,
where
$R^{5'}$ is a linear or branched hydrocarbon moiety containing 2 to 4 carbon atoms,
n is from 1 to 100, preferably from 2 to 60, and
$R^{6'}$ represents hydrogen, a linear or branched optionally double bond-containing aliphatic hydrocarbon moiety having 1 to 30 carbon atoms, an optionally double bond-containing cycloaliphatic hydrocarbon moiety having 5 to 40 carbon atoms, an aromatic hydrocarbon moiety having 6 to 40 carbon atoms, an alkylaryl moiety having 7 to 40 carbon atoms or a —C(O)—$R^{7'}$ moiety where
$R^{7'}$ represents a linear or branched optionally double bond-containing aliphatic hydrocarbon moiety having 1 to 30 carbon atoms, an optionally double bond-containing cycloaliphatic hydrocarbon moiety having 5 to 40 carbon atoms, an aromatic hydrocarbon moiety having 6 to 40 carbon atoms, an alkylaryl moiety having 7 to 40 carbon atoms.

Useful cations for the surfactant B further include ions deriving from saturated or unsaturated cyclic compounds and also from aromatic compounds having in each case at least one tervalent nitrogen atom in a 4- to 10-, preferably 5- to 6-membered heterocyclic ring which may be optionally substituted. Such cations can be described in simplified form (i.e., without indication of the exact position and number of double bonds in the molecule) by the following general formulae (VII), (VIII) and (IX), wherein the heterocyclic rings may optionally also contain two or more heteroatoms:

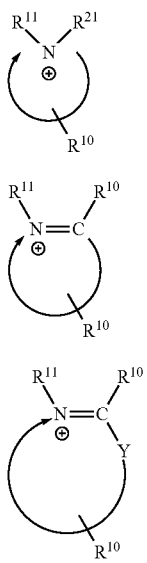

where
R¹⁰ in each occurrence is the same or different and represents a hydrogen, a linear or branched optionally double bond-containing aliphatic hydrocarbon moiety having 1 to 30 carbon atoms, a cycloaliphatic optionally double bond-containing hydrocarbon moiety having 5 to 40 carbon atoms, an aromatic hydrocarbon moiety having 6 to 40 carbon atoms or an alkylaryl moiety having 7 to 40 carbon atoms, $R^{11}$ and $R^{12}$ have the meanings mentioned for $R^{1'}$ and $R^{2'}$, Y represents an oxygen atom or a substituted nitrogen atom ($Y=O$, $NR^{1a}$), $R^{1a}$ represents hydrogen, a linear or branched optionally double bond-containing aliphatic hydrocarbon moiety having 1 to 30 carbon atoms, an optionally double bond-containing cycloaliphatic hydrocarbon moiety having 5 to 40 carbon atoms, an aromatic hydrocarbon moiety having 6 to 40 carbon atoms, an alkylaryl moiety having 7 to 40 carbon atoms, a linear or branched optionally double bond-containing aliphatic hydrocarbon moiety having 2 to 30 carbon atoms interrupted by one or more heteroatoms (oxygen, NH, NR' with R' an optionally double bond-containing $C_1$-$C_{30}$-alkyl moiety, especially —$CH_3$), a linear or branched optionally double bond-containing aliphatic hydrocarbon moiety having 2 to 30 carbon atoms interrupted by one or more functionalities selected from the group —O—C(O)—, —(O)C—O—, —NH—C(O)—, —(CH₃)N—C(O)—, —(O)C—N(CH₃)—, —S(O₂)—O—, —O—S(O₂)—, —S(O₂)—NH—, —NH—S(O₂)—, —S(O₂)—N(CH₃)—, —N(CH₃)—S(O₂)—, a linear or branched optionally double bond-containing aliphatic or cycloaliphatic hydrocarbon moiety having 1 to 30 carbon atoms terminally functionalized OH, OR', NH₂, N(H)R', N(R')₂ (with R' an optionally double bond-containing $C_1$-$C_{30}$-alkyl moiety) or a blockwise or random polyether as per —($R^5$—O)$_n$—$R^6$.

Examples of cyclic nitrogen compounds of the aforementioned type are pyrrolidine, dihydropyrrole, pyrrole, imidazoline, oxazoline, oxazole, isoxazole, indole, carbazole, piperidine, pyridine, the isomeric picolines and lutidines, quinoline and isoquinoline. The cyclic nitrogen compounds of the general formulae (VII), (VIII) and (IX) may be unsubstituted ($R^{10}=H$), monosubstituted, or polysubstituted by $R^{10}$, in which case the individual $R^{10}$ moieties in a polysubstitution by $R^{10}$ can be different.

Useful cations further include ions deriving from saturated, acyclic, saturated or unsaturated cyclic compounds and also from aromatic compounds having in each case more than one tervalent nitrogen atom in a 4- to 10-, preferably 5- to 6-, membered heterocyclic ring. These compounds may be substituted not only at the carbon atoms, but also at the nitrogen atoms. The compounds may further be fused by optionally substituted benzene rings and/or cyclohexane rings to form polynuclear structures. Examples of such compounds are pyrazole, 3,5-dimethylpyrazole, imidazole, benzimidazole, N-methylimidazole, dihydropyrazole, pyrazolidine, pyridazine, pyrimidine, pyrazine, pyridazine, pyrimidine, 2,3-dimethylpyrazine, 2,5-dimethylpyrazine and 2,6-dimethylpyrazine, cimoline, phthalazine, quinazoline, phenazine and piperazine. In some embodiments, cations derived from imidazoline and its alkyl and phenyl derivatives have proved advantageous as constituent.

Useful cations further include ions which contain two nitrogen atoms and are represented by the general formula (X)

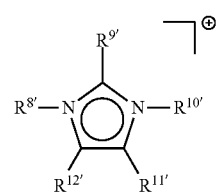

where
$R^{8'}$, $R^{9'}$, $R^{10'}$, $R^{11'}$, $R^{12'}$ can be alike or different and represent hydrogen, a linear or branched optionally double bond-containing aliphatic hydrocarbon moiety having 1 to 30, preferably 1 to 8, especially 1 to 4, carbon atoms, an optionally double bond-containing cycloaliphatic hydrocarbon moiety having 5 to 40 carbon atoms, an aromatic hydrocarbon moiety having 6 to 40 carbon atoms, an alkylaryl moiety having 7 to 40 carbon atoms, a linear or branched optionally double bond-containing aliphatic hydrocarbon moiety having 1 to 30 carbon atoms interrupted by one or more heteroatoms (oxygen, NH, NR' with R' an optionally double bond-containing $C_1$-$C_{30}$-alkyl moiety), a linear or branched optionally double bond-containing aliphatic hydrocarbon moiety having 1 to 30 carbon atoms interrupted by one or more functionalities selected from the group —O—C(O)—, —(O)C—O—, —NH—C(O)—, —(O)C—NH, —(CH₃)N—C(O)—, —(O)C—N(CH₃)—, —S(O₂)—O—, —O—S(O₂)—, —S(O₂)—NH—, —NH—S(O₂)—, —S(O₂)—N(CH₃)—, —N(CH₃)—S(O₂)—, a linear or branched optionally double bond-containing aliphatic or cycloaliphatic hydrocarbon moiety having 1 to 30 carbon atoms terminally functionalized OH, OR', NH₂, N(H)R', N(R')₂ with R' an optionally double bond-containing $C_1$-$C_{30}$-alkyl moiety, or a blockwise or random polyether constructed from —($R^5$—O)$_n$—$R^6$, where $R^5$, n and $R^6$ are each as defined above.

The anions X⁻ in the surfactant B are preferably selected from the group of halides, nitrates, sulphates, hydrogensulphates, alkyl and aryl sulphates, polyether sulphates and sulphonates, sulphonates, alkyl and aryl sulphonates, alkyl and aryl carboxylates, saccharinates, polyether phosphates and phosphates.

The surfactants B present according to the present invention preferably include a chloride, phosphate or methylsulphate anion, preferably a methylsulphate anion, as anions $X^-$.

In some embodiments of the present invention, it may be advantageous for the composition of the present invention to include at least one oxazasilinane. The composition of the present invention preferably contains 2,2,4-trimethyl-1,4,2-oxazasilinane (formula (III))

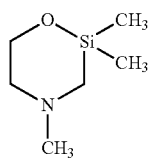
(III)

as oxazasilinane.

The surfactant A is preferably selected from those of formula (Ia)

(Ia)

where $R^1$=organic moiety, especially hydrocarbon moiety or —O— hydrocarbon moiety, preferably $R^1$=saturated or unsaturated hydrocarbon moieties having 5 to 30, preferably 8 to 20, carbon atoms, aryl moieties or alkylaryl moieties, and $M^+$=cation, preferably alkali metal cation and more preferably sodium cation. Preferred ionic surfactants A are for example those of formulae (Ib) to (Id)

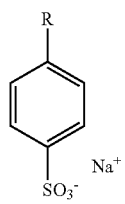
(Ib)

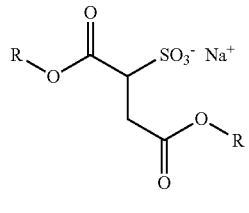
(Ic)

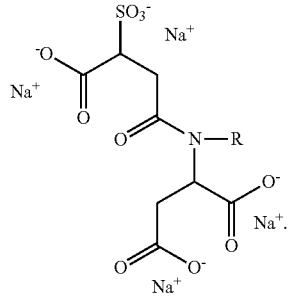
(Id)

Preferred ionic surfactants B are especially imidazolium compounds, more preferably those of formula (IV)

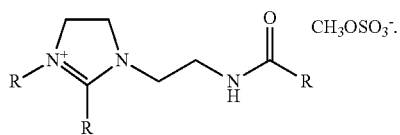
(IV)

The R moieties in the formulae (Ib) to (Id) and (IV) may represent alike or different, saturated or unsaturated, optionally alkoxylated hydrocarbon moieties having 1 to 30, preferably 1 to 20, carbon atoms.

The amines C present according to the present invention are preferably not ionic, i.e., they have no electric charge. Preferred amines C are for example those of formula (V)

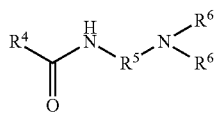
(V)

where
$R^4$=saturated or unsaturated hydrocarbon moieties having 5 to 30, preferably 8 to 20, carbon atoms,
$R^5$=divalent alkyl moiety having 2 or 3 carbon atoms,
$R^6$=alike or different, preferably alike alkyl moieties having 1 to 3 carbon atoms, preferably methyl moieties.

It is particularly preferable for amine C to be a dimethylaminopropyl cocamide.

In the composition of the present invention, the mass ratio of the sum total of all surfactants A and B to the sum total of all amines C is in the range from 20:1 to 1:10, preferably in the range from 10:1 to 1:10 and more preferably in the range from 5:1 to 1:5.

When the composition of the present invention contains one or more oxazasilinanes D, the mass ratio of the sum total of all amines C to the sum total of all oxazasilinanes D is preferably in the range from 500:1 to 1:1, preferably in the range from 200:1 to 5:1 and more preferably in the range from 50:1 to 10:1. The composition preferably contains 2,2,4-trimethyl-1,4,2-oxazasilinane of formula (III)

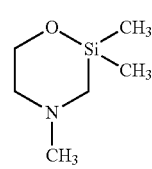
(III)

as an oxazasilinane.

The additive composition of the present invention can be used or present as such, or in combination with other substances used for production of polyurethane foams.

In addition to the components A to D, the composition of the present invention may accordingly contain one or more further substances useable in the production of polyurethane foams and selected from nucleating agents, stabilizers, cell openers, crosslinkers, emulsifiers, flame retardants, antioxidants, antistatics, biocides, color pastes, solid fillers, amine catalysts, metal catalysts and buffering substances. In some embodiments of the present invention, it may be advantageous for the composition of the present invention to contain one or more solvents, preferably selected from glycols, alkoxylates or oils of synthetic and/or natural origin.

The compositions of the present invention can be used in all conventional processes for production of polyurethane foams, such as, for example, flexible polyurethane foam, hot-cure flexible polyurethane foam, rigid polyurethane foam, cold-cure polyurethane foam, ester type polyurethane foam, viscoelastic flexible foam or else high resilience (HR) foam, especially for production of flexible polyurethane foams.

The process of the present invention for production of polyurethane foams by reacting one or more polyol components with one or more isocyanate components is accordingly distinguished in that an additive composition of the present invention is used as additive.

By way of the polyol component, the process of the present invention preferably utilizes—as a whole or in part—those based on natural (renewable) raw materials. The process of the present invention preferably utilizes, as polyol components, mixtures of polyols that include at least 10% by weight and preferably 25% by weight of polyols based on natural (renewable) raw materials, based on the sum total of polyols present.

The amount of additive composition is preferably chosen such that the mass ratio of all polyol components used to the sum total of all amines C used is in the range from 2000:1 to 10:1, preferably in the range from 100:1 to 20:1 and more preferably in the range from 250:1 to 50:1.

The polyurethane (PU) foam is preferably produced by a mixture containing at least one urethane and/or isocyanurate catalyst, at least one blowing agent, at least one isocyanate component and at least one polyol component foamed in the presence of the additive composition of the present invention.

In addition to the components mentioned, the mixture may include further constituents, for example, optionally (further) blowing agents, optionally prepolymers, optionally flame retardants and optionally further additives (other than those mentioned in the additive composition of the present invention), for example, fillers, emulsifiers, emulsifiers based on the reaction of hydroxyl-functional compounds with isocyanate, stabilizers, for example Si-containing ones and non-Si-containing ones, especially Si-containing and non-Si-containing organic stabilizers and surfactants, viscosity reducers, dyes, antioxidants, UV stabilizers or antistatics. It will be readily understood that a person skilled in the art seeking to produce the different flexible polyurethane foam types, i.e., hot-cure, cold-cure or ester flexible polyurethane foams, will select the necessary substances in each case, for example isocyanate, polyol, prepolymer, stabilizers, etc. appropriately in order that the particularly desired flexible polyurethane foam type may be obtained.

Following is a list of property rights which describe suitable components and processes for producing the different flexible polyurethane foam types, i.e., hot-cure, cold-cure and also ester type flexible polyurethane foams, and which are fully incorporated herein by reference: EP 0152878 A1, EP 0409035 A2, DE 102005050473 A1, DE 19629161 A1, DE 3508292 A1, DE 4444898 A1, EP 1061095 A1, EP 0532939 B1, EP 0867464 B1, EP1683831 A1 and DE102007046860 A1.

Further particulars concerning useable starting materials, catalysts and also auxiliary and addition agents appear, for example, in Kunststoff-Handbuch, volume 7, Polyurethane, Carl-Hanser-Verlag Munich, 1st edition, 1966, 2nd edition, 1983 and 3rd edition, 1993.

The compounds, components and additives hereinbelow are merely mentioned by way of example and can be replaced by other substances known to the person skilled in the art.

Further surfactants useful in the production of flexible polyurethane foams may be, for example, selected from non-ionic surfactants and/or amphoteric surfactants.

Surfactants useful for the purposes of the present invention also can include polymeric emulsifiers, such as polyalkyl polyoxyalkyl polyacrylates, polyvinylpyrrolidones or polyvinyl acetates. Useful surfactants/emulsifiers further include prepolymers obtained by reaction of small amounts of isocyanates with polyols (so-called oligourethanes), and which are preferably in the form of a solution in polyols.

Commercially available biocides can be used, such as chlorophene, benzisothiazolinone, hexahydro-1,3,5-tris(hydroxyethyl-s-triazine), chloromethylisothiazolinone, methylisothiazolinone or 1,6-dihydroxy-2,5-dioxohexane, which are known by the trade names of BIT 10, Nipacide BCP, Acticide MBS, Nipacide BK, Nipacide CI, Nipacide FC.

Oftentimes, all the components other than the polyols and isocyanates are mixed together, before foaming, to form an activator solution. The activator solution then contains inter alia the additive composition which can be used according to the present invention, stabilizers, catalysts/catalyst combination, the blowing agent, for example water, and also any other further additives, such as flame retardants, color, biocides, etc., depending on the recipe of the flexible polyurethane foam. This activator solution can also be a composition according to the present invention.

There are chemical blowing agents and there are physical blowing agents. Chemical blowing agents include, for example, water, the reaction of which with isocyanate groups leads to $CO_2$ formation. Foam density can be controlled via the amount of water added, the preferred use levels of water being between 0.5 and 7.5 parts, based on 100.0 parts of polyol. Physical blowing agents, such as carbon dioxide, acetone, hydrocarbons, such as n-pentane, isopentane or cyclopentane, cyclohexane, halogenated hydrocarbons, such as methylene chloride, tetrafluoroethane, pentafluoropropane, heptafluoropropane, pentafluorobutane, hexafluorobutane and/or dichloromonofluoroethane, can also be used alternatively and/or else additionally. The amount of physical blowing agent is preferably in the range between 1 to 20 parts by weight and especially 1 to 15 parts by weight, the amount of water is preferably in the range between 0.5 to 10 parts by weight and especially 1 to 5 parts by weight. Carbon dioxide is preferred among the physical blowing agents and is preferentially used in combination with water as chemical blowing agent.

The activator solution may additionally contain any customary additives known in the prior art for activator solutions. The additives may be selected from flame retardants, UV stabilizers, dyes, biocides, pigments, cell openers, crosslinkers and the like.

A flexible polyurethane foam is preferably produced by reacting a mixture of polyol, di- or polyfunctional isocyanate, additive composition of the present invention, amine catalyst, organic potassium, zinc and/or tin compound or other metal-containing catalysts, stabilizer, blowing agent, preferably water to form $CO_2$ and, if necessary, an addition of physical blowing agents, optionally in the presence of flame retardants, UV stabilizers, color pastes, biocides, fillers, crosslinkers or other customary processing aids. The mixture may also be a composition according to the present invention.

Useful isocyanates include organic isocyanate compounds containing two or more isocyanate groups. In general, the aliphatic, cycloaliphatic, aralphatic and preferably aromatic polyfunctional isocyanates known per se are possible. Particular preference is given to using isocyanates in a range from 60 to 140 mol % relative to the sum total of isocyanate-consuming components.

Specific examples are: alkylene diisocyanates having 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates, such as cyclohexane 1,3-diisocyanate and 1,4-diisocyanate and also any desired mixtures of these isomers, 1-isocyanato-3,3,5-trimethyl-5-isocyanatomethylcyclohexane (IPDI), 2,4- and 2,6-hexahydrotoluoylene diisocyanate and also the corresponding isomeric mixtures, 4,4'-, 2,2'- and 2,4'-dicyclohexylmethane diisocyanate and also the corresponding isomeric mixtures, and preferably aromatic di- and polyisocyanates, for example 2,4- and 2,6-toluoylene diisocyanate and the corresponding isomeric mixtures, 4,4'-, 2,4'- and 2,2'-diphenylmethane diisocyanate and the corresponding isomeric mixtures, mixtures of 4,4'- and 2,2'-diphenylmethane diisocyanates, polyphenyl polymethylene polyisocyanates, mixtures of 4,4'-, 2,4'- and 2,2'-diphenylmethane diisocyanates and polyphenyl polymethylene polyisocyanates (polymeric MDI) and mixtures of polymeric MDI and toluoylene diisocyanates. Organic di- and polyisocyanates can be used individually or as mixtures thereof.

It is also possible to use isocyanates modified through incorporation of urethane, uretdione, isocyanurate, allophanate and other groups, so-called modified isocyanates.

The following have been found to be particularly useful as organic polyisocyanates and therefore are used with preference:
toluoylene diisocyanate, mixtures of diphenylmethane diisocyanate isomers, mixtures of diphenylmethane diisocyanate and polyphenyl polymethyl polyisocyanate or toluoylene diisocyanate with diphenylmethane diisocyanate and/or polyphenyl polymethyl polyisocyanate or so-called prepolymers.

TDI (2,4- and 2,6-toluoylene diisocyanate isomeric mixture), and also MDI (4,4'-diphenylmethane diisocyanate) can be used. The so-called "crude MDI" or "polymeric MDI" contains the 2,4'- and 2,2'-isomers as well as the 4,4'-isomer and also more highly nuclear products. The appellation "pure MDI" is applied to binuclear products consisting predominantly of 2,4'- and 4,4'-isomeric mixtures and/or prepolymers thereof. Further suitable isocyanates are recited in DE 444898 and EP 1095968, which are hereby fully incorporated herein by reference.

Crosslinkers are low molecular weight isocyanate-reactive polyfunctional compounds. Suitable crosslinkers are hydroxyl- or amine-terminated substances, such as glycerol, triethanolamine (TEOA), diethanolamine (DEOA) and trimethylolpropane. Use concentration is typically between 0.1 and 5 parts, based on 100.0 parts of polyol depending on the formulation, but can also depart therefrom. When crude MDI is used in mold foaming, it likewise assumes a crosslinking function. The level of low molecular weight crosslinkers can therefore be reduced in proportion with the increasing amount of crude MDI.

The compositions of the present invention can be used not only in block foaming, but also in mold foaming. Any process known to a person skilled in the art for production of flexible polyurethane foams can be used. For instance, the foaming process can take place both horizontally and vertically in continuous or batch equipment. Similarly, the stabilizer formulations of the present invention can be used for $CO_2$ technology. The use in low pressure or high pressure machines is possible, in which case the formulations of the present invention can be metered directly into the mixing chamber or else are admixed upstream of the mixing chamber to one of the components subsequently passing into the mixing chamber. Admixing can also take place in the raw material tank.

Useful polyol components based on renewable raw materials or natural oil based polyols (NOPs) include for example those described in WO 2004/020497, U.S. Patent Application Publication No. 2006/0229375, WO 2009/058367, WO 2006/094227, WO 2004/096882, U.S. Patent Application Publication No. 2002/0103091, WO 2006/116456 and EP 1678232. Preferred NOPs are those which are obtainable on the basis of, for example, castor oil, soybean oil, peanut oil, rapeseed oil, palm oil or sunflower oil. Except for castor oil, the aforementioned plant oils do not contain any hydroxyl groups. The hydroxyl group required for polyurethane formation can be introduced in various ways, some of which may be mentioned here by way of example: ozonolysis with subsequent hydrogenation [Petrovic Z S, Zhang W, Javni I, Biomacromolecules 2005; 6: 713-9]; epoxidation with subsequent ring opening (WO 2009/058367; U.S. Pat. No. 6,433, 121); hydroformylation with subsequent hydrogenation (WO 2004096744); air oxidation with subsequent ring opening or hydroformylation (U.S. Patent Application Publication No. 2006/0229375); microbiological conversion into OH-functional polyols [Hou C T, Adv. Appl. Microbiol. 1995; 41: 1-23]. The OH-functionalized biopolyols can be used for production of polyurethane foams either directly or after alkoxylation. The alkoxylation of OH-functionalized biopolyols can be carried out by the process of alkaline alkoxylation or by using DMC catalysts.

In addition to or in place of, preferably in addition to polyol components based on renewable raw materials, the mixture may contain any known polyol compounds as further polyol components.

This may concern, for example, polyether or polyester polyols which typically bear from 2 to 6 OH groups per molecule and may contain heteroatoms such as nitrogen, phosphorous or halogens as well as carbon, hydrogen and oxygen; preference is given to using polyether polyols. Such polyols are obtainable by known methods, for example, via anionic polymerization of alkylene oxides in the presence of alkali metal hydroxides or alkali metal alkoxides as catalysts and in the presence of at least one starter molecule containing 2 to 3 reactive hydrogen atoms in attached form, or via cationic polymerization of alkylene oxides in the presence of Lewis acids such as, for example, antimony pentachloride or boron fluoride etherate, or via double metal cyanide catalysis. Suitable alkylene oxides contain 2 to 4 carbon atoms in the alkylene moiety. Examples are tetrahydrofuran, 1,3-propylene oxide, 1,2-butylene oxide and 2,3-butylene oxide; preference is given to using ethylene oxide and/or 1,2-propylene oxide. Alkylene oxides can be used individually, alternating in succession or as mixtures. Useful starter molecules include water or alcohols with 2 or 3 OH-groups, such as ethylene glycol, 1,2-propanediol, 1,3-propanediol, diethylene glycol, dipropylene glycol, glycerol, trimethylolpropane, etc. Polyfunctional polyols such as, for example, sugars can also be used as starters. The polyether polyols, preferably polyoxypropylene-polyoxyethylene polyols, have a functionality of 2 to 8 and number-averaged molecular weights in the range from 500 to 8000 and preferably in the range from 800 to 4500. Further polyols are known to a person skilled in the art and are discernible for example from EP-A-0 380 993 or U.S. Pat. No. 3,346,557, which are hereby incorporated in full by reference.

Molded and high resilience flexible foams are preferably produced using two- and/or three-functional polyether alcohols which preferably have above 50 mol %, based on the sum total of hydroxyl groups, of primary hydroxyl groups, especially those having an ethylene oxide block at the chain end or those which are based only on ethylene oxide.

Conventional flexible slabstock foams are preferably produced using two- and/or three-functional polyether alcohols which have secondary hydroxyl groups, preferably above 80 mol %, especially those having a propylene oxide block or random propylene or ethylene oxide block at the chain end or those which are based only on propylene oxide blocks.

A further class of polyols are those which are obtained as prepolymers via reaction of polyol with isocyanate in a molar ratio of 100:1 to 5:1 and preferably 50:1 to 10:1. Such prepolymers are preferably used in the form of a solution in a polyol, and the polyol preferably corresponds to the polyol used for preparing the prepolymers.

A still further class of polyols is that of the so-called filled polyols (polymer polyols). These contain dispersed solid organic fillers up to a solids content of 40% by weight or more. Use is made of inter alia:

SAN polyols: these are highly reactive polyols containing a dispersed copolymer based on styrene-acrylonitrile (SAN).

PHD polyols: these are highly reactive polyols containing polyurea, likewise in dispersed form.

PIPA polyols: these are highly reactive polyols containing a dispersed polyurethane, for example, formed by in situ reaction of an isocyanate with an alkanolamine in a conventional polyol.

The solids content, which is preferably between 5% and 40% by weight, based on the polyol, depending on the application, is responsible for improved cell opening, and so the polyol can be foamed in a controlled fashion, in particular with TDI, and no shrinkage of the foams occurs. The solid thus acts as an essential processing aid. A further function is to control the hardness via the solids content, since higher solids contents bring about a higher hardness on the part of the foam.

The formulations with solids-containing polyols are distinctly less self-stable and therefore tend to require physical stabilization in addition to the chemical stabilization due to the crosslinking reaction.

Depending on the solids contents of the polyols, these are used either alone or in admixture with the abovementioned unfilled polyols.

Known blowing agents can be used. The polyurethane foam is preferably produced using water, methylene chloride, pentane, alkanes, halogenated alkanes, acetone and/or carbon dioxide as a blowing agent.

Water can be added to the mixture directly or, alternatively, as a secondary component with one of the reactants, for example the polyol component.

In addition to physical blowing agents and optionally water, other chemical blowing agents, which react with isocyanates to evolve a gas, can also be used, formic acid being an example.

Catalysts which may be present in the mixture include those which catalyze the gel reaction (isocyanate-polyol), the blowing reaction (isocyanate-water) or the di- or trimerization of the isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N,N-dimethylhexadecylamine, oxazasilinane, N-ethylmorpholine, tris(dimethylaminopropyl)hexahydro-1,3,5-triazine, N,N-dimethylaminoethanol, dimethylaminoethoxyethanol and bis(dimethylaminoethyl)ether, zinc compounds/salts, tin compounds/salts, preferably tin ricinoleate, and potassium salts such as potassium acetate and potassium 2-ethylhexanoate. Preference for use as catalysts is given to those which include tin ricinoleate and/or N,N-dimethylhexadecylamine Suitable use levels depend on the type of catalyst and typically range from 0.02 to 5 pphp (=parts by weight per 100 parts by weight of polyol).

The process of the present invention provides a polyurethane foam, especially a flexible polyurethane foam, that is notable in particular for the fact that the polyol component used for producing it is at least partially based on natural (renewable) raw materials.

The polyurethane foam of the present invention provides access to articles containing or consisting of this polyurethane foam. Such articles can be, for example, furniture cushioning pads, refrigerator insulants, spray foams, metal composite elements for (built structure) insulation, mattresses or automotive seats.

The subject matter of the present invention will now be more particularly elucidated using examples without any intention to restrict the subject matter of the invention to these exemplary embodiments.

Producing the Polyurethane Foams

The polyurethane foams were produced using 400 g of polyol; the other formulation constituents were arithmetically converted appropriately. For example, 1.0 part of a component meant 1 g of this substance per 100 g of polyol.

For foaming, the polyol, water, catalyst (amine(s) and/or the tin compound), stabilizer and inventive additive composition were thoroughly mixed by stirring. Following addition of the isocyanate, the mixture was stirred at 3000 rpm for 7 sec and was poured into a paper-lined wooden box (base area 27 cm×27 cm). A foam was obtained and subjected to the performance tests described hereinbelow.

In accordance with recipe 2 in table 2 based on 4.0 parts of water, flexible slabstock polyurethane foams were produced using a vegetable polyol based on soybean oil, a conventional stabilizer and different additives. The resulting foams were compared against each other in respect of their characteristics during the foaming process and in respect of their physical properties. The reference foams used were first a flexible polyurethane foam produced from 100% standard polyol (of petrochemical origin) (table 1, recipe 1) and, secondly, a flexible polyurethane foam as per table 2 without addition of a specific additive.

Reference foams, which did not include any polyol based on vegetable raw materials, were produced in accordance with the recipe indicated in table 1.

TABLE 1

Recipe 1 for reference foam from purely mineral oil-based polyol (particulars in parts by mass)

| | | |
|---|---|---|
| 100 parts | Voranol ® CP 3322 (Dow Chemical)*[1] polyol | |
| 4.0 parts | Water | |
| 0.8 part | TEGOSTAB ® B 8228 (Evonik Goldschmidt GmbH) | |
| 0.15 part | TEGOAMIN ® 33 (Evonik Goldschmidt GmbH) | |
| 0.18 part | KOSMOS ® 29 (Evonik Goldschmidt GmbH) | |
| 49.7 parts | isocyanate (T80 toluylene diisocyanate) | |
| index <108> | (80% 2,4-isomer, 20% 2,6-isomer) (Bayer Material Science AG) | |

*[1]=Voranol ® CP 3322, obtainable from Dow Chemical, a polyether triol of OH number 47 mg KOH/g.

The foams which include a polyol based on renewable raw materials were produced in accordance with the recipes indicated in table 2.

TABLE 2

Recipe 2 with vegetable polyol (particulars in parts by mass)

| | |
|---|---|
| 70 parts | Voranol ® CP 3322 (Dow Chemical)*[1] polyol |
| 30 parts | vegetable polyol based on soybean oil*[2] |
| 4.0 parts | water total |
| 0.8 part | TEGOSTAB ® B 8228 (Evonik Goldschmidt GmbH) stabilizer |
| 0.15 part | TEGOAMIN ® 33 (Evonik Goldschmidt GmbH) |
| 0.18 part | KOSMOS ® 29 (Evonik Goldschmidt GmbH) |
| variable | inventive additive |
| index <108> | isocyanate (T80 toluylene diisocyanate) (80% 2,4-isomer, 20% 2,6-isomer) (Bayer Material Science AG) |

*[1] = Voranol ® CP 3322, obtainable from Dow Chemical, a polyether triol of OH number 47 mg KOH/g.
*[2] = BIOH ® X-0500 from Cargill.

Ionic Surfactants Used:

Surfactant A1: Marlon AM 80, (benzenesulphonic acid, C10-13 alkyl derivatives, sodium salts, available from Sasol)

Surfactant A2: Rewopol B 2003 (Evonik Goldschmidt Rewo GmbH, tetrasodium N-(3-carboxylato-1-oxo-3-sulphonatopropyl)-N-octadecyl-DL-aspartate >=34 to <=36%; methanol <3%)

Surfactant A3: Rewopol SB DO 75 (Evonik Goldschmidt Rewo GmbH, sodium diisooctylsulphosuccinate 75%; ethanol 9.5%)

Surfactant A4: petroleum sulphonate (Additiv Chemie Luers GmbH & Co Kg.)

Surfactant B: Rewoquat W 3690 (Evonik Goldschmidt GmbH, imidazolium compounds, 2-(C17- and C 17-unsaturated alkyl)-1-[2-(C18- and C18-unsaturated amido)ethyl]-4,5-dihydro-1-methyl-, methylsulphates >=75 to <=77%; 2-propanol, >=23 to <=25%)

Tertiary Amine Used:

Amine C: Coco fatty acid amide amine, static surface tension 0.5% in water: 27.7 mN/m, (Evonik Goldschmidt GmbH, Tego Amid D5040)

Oxazasilinane Used:

2,2,4-Trimethyl-1,4,2-oxazasilinane (Apollo Scientific Ltd.)

Performance Tests

The foams produced were assessed on the following physical properties:

a) Foam settling at the end of the rise time:
Settling or conversely post-rise was obtained from the difference in foam height after direct blow-off and after 3 min after blow-off of the foam. Foam height was measured using a needle secured to a centimetre scale, on the peak in the middle of the foam top surface. A negative value described the settling of the foam after the blow-off, while a positive value correspondingly described the post-rise of the foam.

b) Foam height
The final height of the foam was determined by subtracting the settling from or adding the post-rise to the foam height after blow-off.

c) Density
Determined as described in ASTM D 3574-08 under test A by measuring the core density.

d) The air permeability of the foam was measured as back pressure. The measured back pressure was reported in mm of water column, with the lower values characterizing the more open foam. The values were measured in the range from 0 to 300 mm e) Compression load deflection CLD 40% to DIN EN ISO 3386-1.

f) Rebound resilience (ball rebound test) to ASTM D 1564-71.

g) Tensile strength and elongation at break to DIN EN ISO 1798.

h) Number of cells per cm.

The results of the performance tests for the various recipes and additives used are reported in tables 3 to 5.

TABLE 3

| | Experiment | | | |
|---|---|---|---|---|
| | 1.1 | 1.2 | 1.3 | 1.4 |
| | Recipe 1 100 parts of standard polyol | | Recipe 2 30 parts of vegetable polyol | |
| TEGOSTAB ® B 8228 | 0.8 | — | 0.8 | — |
| NOP stabilizers ex example 1.1 ex DE 102010039004 | — | 0.8 | — | 0.8 |
| rise time (s) | 95 | 87 | 122 | 108 |
| settling (cm) | −0.4 | −1.9 | −0.3 | −0.5 |
| foam height (cm) | 30.2 | 29.0 | 30.3 | 29.4 |
| porosity (mm water column) | 10 | 10 | 22 | 18 |
| density (kg/m³) | 24.8 | 26.7 | 24.6 | 25.0 |
| compression load deflection CLD 40% (kPa) | 3.6 | 4.0 | 3.2 | 3.4 |
| resilience, ball rebound (%) | 45 | 45 | 31 | 34 |
| tensile strength (kPa) | 97 | 110 | 69 | 89 |
| elongation at break (%) | 174 | 158 | 100 | 126 |
| cells/cm | 14 | 12-13 | 10 | 13 |
| observation | regular cell structure | irregular cell structure; bottom-skin densification | regular cell structure | regular cell structure |

TABLE 4

| | Experiment | | | | | | | | | | | | | |
|---|---|---|---|---|---|---|---|---|---|---|---|---|---|---|
| | 2 | 3 | 4.1 | 4.2 | 4.3 | 5.1 | 5.2 | 5.3 | 6.1 | 6.2 | 6.3 | 7.1 | 7.2 | 7.3 |
| | PU foams with 30 parts of vegetable polyol as per recipe 2 of table 2 | | | | | | | | | | | | | |
| surfactant A1 (parts) | — | — | 0.8 | 0.8 | 0.8 | — | — | — | — | — | — | — | — | — |
| surfactant A2 (parts) | — | — | — | — | — | — | — | — | 0.4 | 0.4 | 0.4 | — | — | — |
| surfactant A3 (parts) | — | — | — | — | — | — | — | — | — | — | — | 1 | 1 | 1 |
| surfactant B (parts) | — | — | — | — | — | 0.2 | 0.2 | 0.2 | — | — | — | — | — | — |

TABLE 4-continued

| | Experiment | | | | | | | | | | | | | |
|---|---|---|---|---|---|---|---|---|---|---|---|---|---|---|
| | 2 | 3 | 4.1 | 4.2 | 4.3 | 5.1 | 5.2 | 5.3 | 6.1 | 6.2 | 6.3 | 7.1 | 7.2 | 7.3 |
| | PU foams with 30 parts of vegetable polyol as per recipe 2 of table 2 | | | | | | | | | | | | | |
| amine C (parts) | — | 0.2 | — | 0.2 | 0.2 | — | 0.2 | 0.2 | — | 0.2 | 0.2 | — | 0.2 | 0.2 |
| oxazasilinane (parts) | — | — | — | 0.006 | — | — | — | 0.006 | — | — | 0.006 | — | — | 0.006 |
| rise time (s) | 127 | 113 | 125 | 114 | 101 | 138 | 125 | 109 | 114 | 109 | 105 | 125 | 112 | 103 |
| settling (cm) | −0.2 | +1.0 | 0.0 | +0.3 | −0.4 | 0.0 | 0.0 | −0.2 | −0.5 | −0.7 | −0.5 | −0.1 | −0.3 | −0.4 |
| foam height (cm) | 29.4 | 32 | 30.6 | 32.3 | 33.3 | 30.9 | 32.1 | 32.8 | 31 | 31.7 | 32.7 | 32.7 | 32.3 | 33.6 |
| porosity (mm water column) | 47 | 26 | 21 | 32 | 20 | 18 | 17 | 16 | 54 | 50 | 52 | 20 | 24 | 32 |
| density (kg/m³) | 23.5 | 24.7 | 23.7 | 24.6 | 23.4 | 23.4 | 23.4 | 23 | 23.9 | 23.8 | 24.8 | 23 | 23 | 22.2 |
| compression load deflection CLD 40% (kPa) | 2.9 | 2.6 | 2.6 | 2.5 | 2.6 | 2.6 | 2.4 | 2.6 | 2.5 | 2.4 | 2.6 | 2.5 | 2.4 | 2.4 |
| resilience; ball rebound (%) | 36 | 38 | 38 | 38 | 38 | 38 | 38 | 39 | 37 | 38 | 38 | 37 | 37 | 37 |
| tensile strength (kPa) | 69 | 74 | 74 | 89 | 87 | 75 | 79 | 101 | 74 | 79 | 85 | 74 | 79 | 87 |
| elongation at break (%) | 98 | 121 | 133 | 140 | 150 | 128 | 141 | 138 | 119 | 129 | 138 | 132 | 141 | 144 |
| cells/cm | 12 | 13 | 13 | 13 | 13 | 13 | 13 | 13 | 13 | 13 | 13 | 13 | 13 | 13 |
| observation | ok | gross splits | gross splits | ok | ok | gross splits | ok | ok | ok | ok | ok | gross splits | ok | ok |

TABLE 5

| | Experiment | | |
|---|---|---|---|
| | 8.1 | 8.2 | 8.3 |
| | PU foams with 30 parts of natural oil based polyol as per recipe 2 | | |
| surfactant A4 (parts) | — | 0.6 | 0.6 |
| amine C (parts) | — | — | 0.2 |
| oxazasilinane (parts) | — | — | 0.006 |
| rise time (s) | 125 | 125 | 103 |
| settling (cm) | 0.0 | 0.0 | −0.3 |
| foam height | 30.6 | 29.9 | 31.8 |
| porosity (mm water column) | 32 | 37 | 47 |
| density (kg/m³) | 24.3 | 24.2 | 24.1 |
| CLD 40% (kPa) | 3.0 | 3.0 | 2.8 |
| resilience; ball rebound (%) | 36 | 37 | 37 |
| tensile strength (kPa) | 64 | 75 | 86 |
| elongation at break (%) | 98 | 112 | 124 |
| cells/cm | 12 | 13 | 13 |

The results of the physical properties in table 3 experiments 1.1 and 1.3 show that replacing standard polyols with vegetable polyols resulted in a changed rise time and foam hardness and also a distinct decrease in resiliency, tensile strength and elongation at break. Similarly, the cell count per centimetre decreased on adding vegetable polyols to the formulation mixture. By using specific stabilizers developed for NOP applications, described in example 1.1 of patent document DE 102010039004, for example, the physical foam properties of resilience, elongation at break, tensile strength and cell structure can be improved compared with conventional stabilizers. However, these NOP stabilizers are disadvantageous in that they are not readily suitable for applications in formulations without vegetable polyols. As experiment 1.2 shows, these lead to a distinct settling of the foam, which resulted in reduced foam height, increased foam density and bottom-skin densification. With regard to NOP-containing formulations, however, the sole use of conventional stabilizers frequently had infirmities. This was particularly evident in the physical values obtained for resilience, elongation at break and tensile strength and also in the cell structure. However, when conventional stabilizers were used in combination with inventive additive compositions for foaming, the physical properties such as resiliency, tensile strength and elongation at break can be improved distinctly. As experiments 2 to 8 show, a significant improvement in the physical foam properties was achieved on using the inventive combinations of ionic surfactants with tertiary amine compounds. In addition to the purely physical measurements of resiliency, tensile strength and elongation at break, the use of the inventive combination of ionic surfactants with tertiary amine compounds led to improved processability. While the sole use of ionic surfactants in examples 4.1, 5.1 and 7.1 gave foams having large gross splits, the addition of the inventive additive composition led to defect-free foam blocks.

A further advantage of the additive composition of the present invention was that the cell structure can be improved without additional additives compared with polyurethane foams.

Different values obtained for the reference foams corresponding to recipe 2 without inventive additive composition can be explained by the fact that these foams were produced on different days.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A process for production of polyurethane foams comprising reacting one or more polyol components with one or more isocyanate components in the presence of an additive composition, said additive composition comprising:
    (i) at least one quaternized ammonium compound that functions as an ionic surfactant;
    (ii) at least one tertiary amine compound having a molar mass of at least 150 g/mol and is a compound of formula (V)

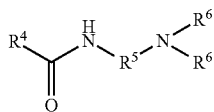

where
- $R^4$ is selected from saturated or unsaturated hydrocarbon moieties having 5 to 30 carbon atoms,
- $R^5$ is selected from divalent alkyl moieties having 2 or 3 carbon atoms,
- $R^6$ is selected from alike or different alkyl moieties having 1 to 3 carbon atoms; and
- (iii) at least one oxazasilinane;
- wherein the mass ratio of the total mass of all of the at least one tertiary amine compounds having a molar mass of least 150 g/mol and of the formula (V) to the total mass of all oxazasilinanes is in a range from 200:1 to 5:1.

2. The process according to claim 1, wherein the additive composition is present in an amount wherein a mass ratio of said one or more polyol components to the total mass of all of the at least one tertiary amine compounds having a molar mass of least 150 g/mol and of the formula (V) is in a range from 2000:1 to 10:1.

3. The process according to claim 1, wherein at least one of said one or more polyols are based on natural raw materials.

4. The process according to claim 1, wherein said reacting is performed in the presence of a catalyst.

5. The process according to claim 4, wherein said catalyst is tin ricinoleate, N,N-dimethylhexadecylamine or a combination of tin ricinoleate and N,N-dimethylhexadecylamine.

6. A composition comprising a polyurethane foam having incorporated therein an additive composition comprising:
- (i) at least one quaternized ammonium compound that functions as an ionic surfactant;
- (ii) at least one tertiary amine compound having a molar mass of at least 150 g/mol and is a compound of formula (V)

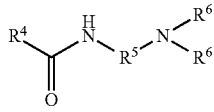

where
- $R^4$ is selected from saturated or unsaturated hydrocarbon moieties having 5 to 30 carbon atoms,
- $R^5$ is selected from divalent alkyl moieties having 2 or 3 carbon atoms,
- $R^6$ is selected from alike or different alkyl moieties having 1 to 3 carbon atoms; and
- (iii) at least one oxazasilinane; and
- wherein the mass ratio of the total mass of all of the at least one tertiary amine compounds having a molar mass of least 150 g/mol and of the formula (V) to the total mass of all oxazasilinanes is in a range from 200:1 to 5:1.

7. An article of manufacture comprising a polyurethane foam having incorporated therein an additive composition comprising:

- (i) at least one quaternized ammonium compound that functions as an ionic surfactant;
- (ii) at least one tertiary amine compound having a molar mass of at least 150 g/mol and is a compound of formula (V)

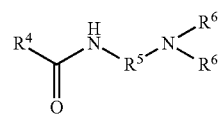

where
- $R^4$ is selected from saturated or unsaturated hydrocarbon moieties having 5 to 30 carbon atoms,
- $R^5$ is selected from divalent alkyl moieties having 2 or 3 carbon atoms,
- $R^6$ R is selected from alike or different alkyl moieties having 1 to 3 carbon atoms; and
- (iii) at least one oxazasilinane; and
- wherein the mass ratio of the total mass of all of the at least one tertiary amine compounds having a molar mass of least 150 g/mol and of the formula (V) to the total mass of all oxazasilinanes is in a range from 200:1 to 5:1.

8. The composition of claim 6 wherein $R^4$ is selected from saturated or unsaturated hydrocarbon moieties having 8 to 20 carbon atoms, and each $R^6$ is methyl.

9. The composition of claim 6 wherein said at least one quaternized ammonium compound is an imidazolium compound.

10. The composition of claim 9 wherein the imidazolium compound is an imidazolium compound of formula (IV)

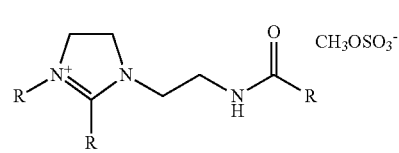

wherein R may be alike or different, saturated or unsaturated, optionally alkoxylated hydrocarbon moieties having 1 to 30 carbon atoms.

11. The composition of claim 1 wherein said at least one quaternized ammonium compound is an imidazolium compound of formula (IV)

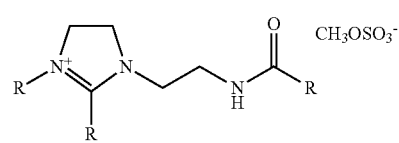

wherein R may be alike or different, saturated or unsaturated, optionally alkoxylated hydrocarbon moieties having 1 to 30 carbon atoms.

* * * * *